Figure 1:
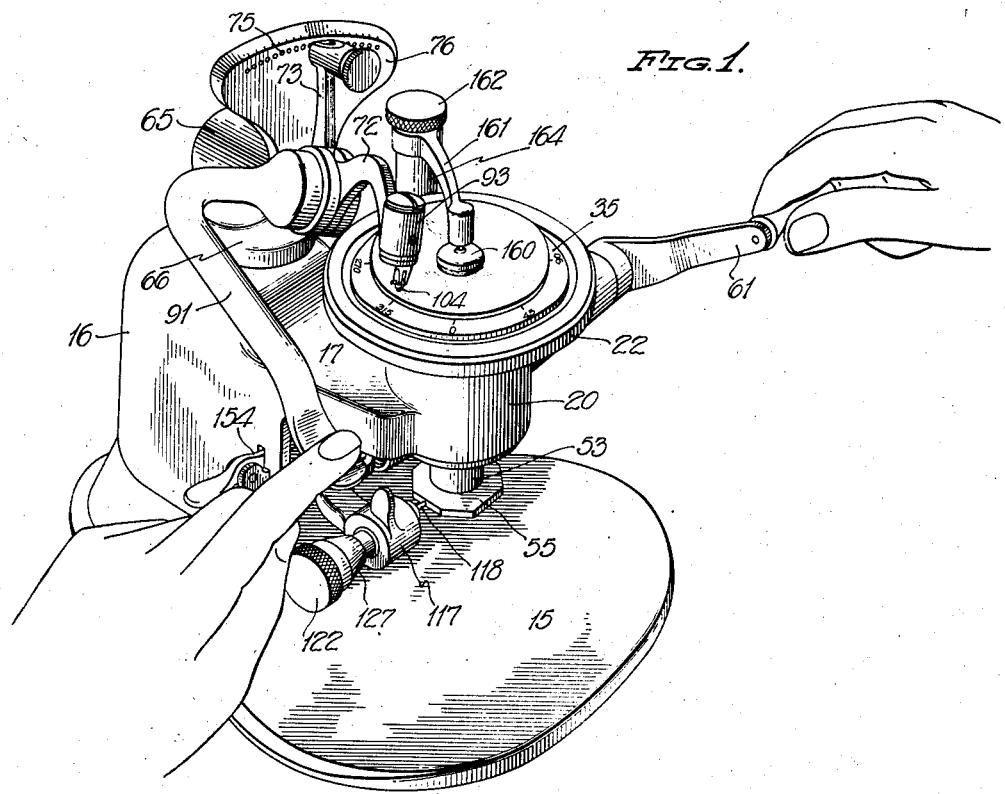

Feb. 20, 1940.  G. W. BURROUGHS  2,190,641
GLASS CUTTING MACHINE
Filed Oct. 5, 1937  3 Sheets-Sheet 1

GEORGE W. BURROUGHS,
INVENTOR.
BY Ely Pattison,
ATTORNEYS.

Feb. 20, 1940.  G. W. BURROUGHS  2,190,641
GLASS CUTTING MACHINE
Filed Oct. 5, 1937  3 Sheets-Sheet 2
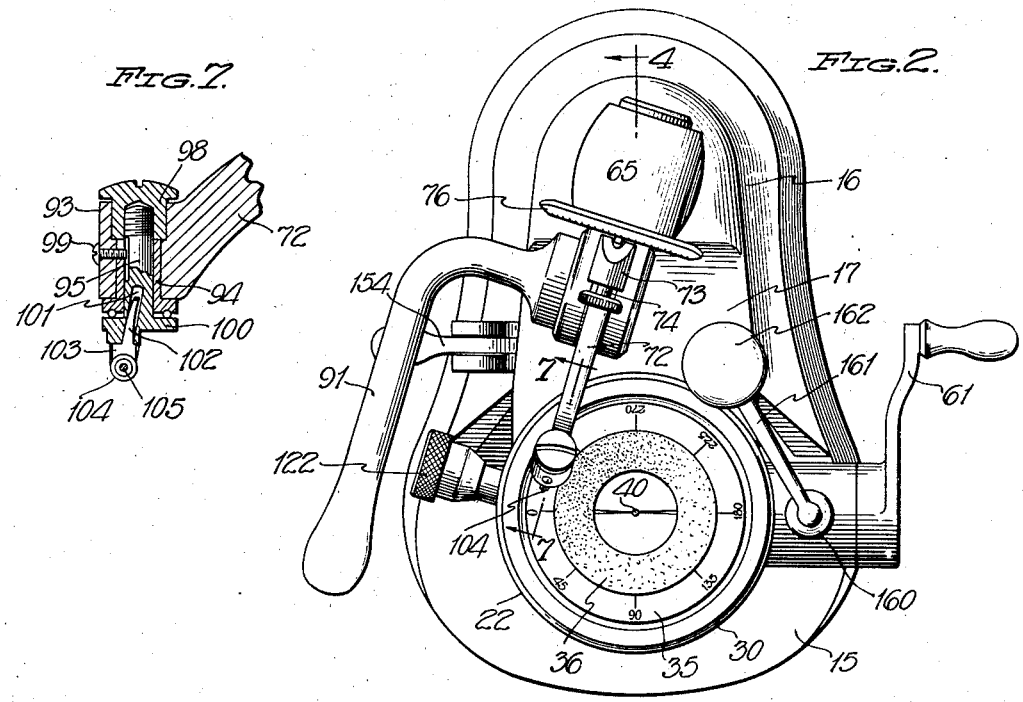
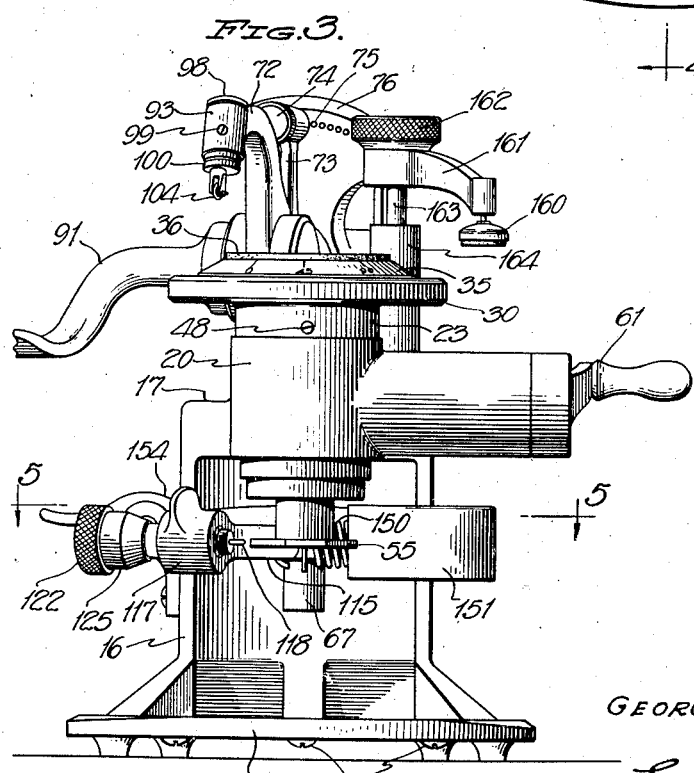
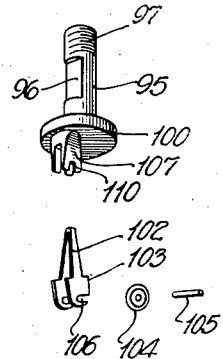
GEORGE W. BURROUGHS.
INVENTOR.
BY Ely Pattison.
ATTORNEYS.

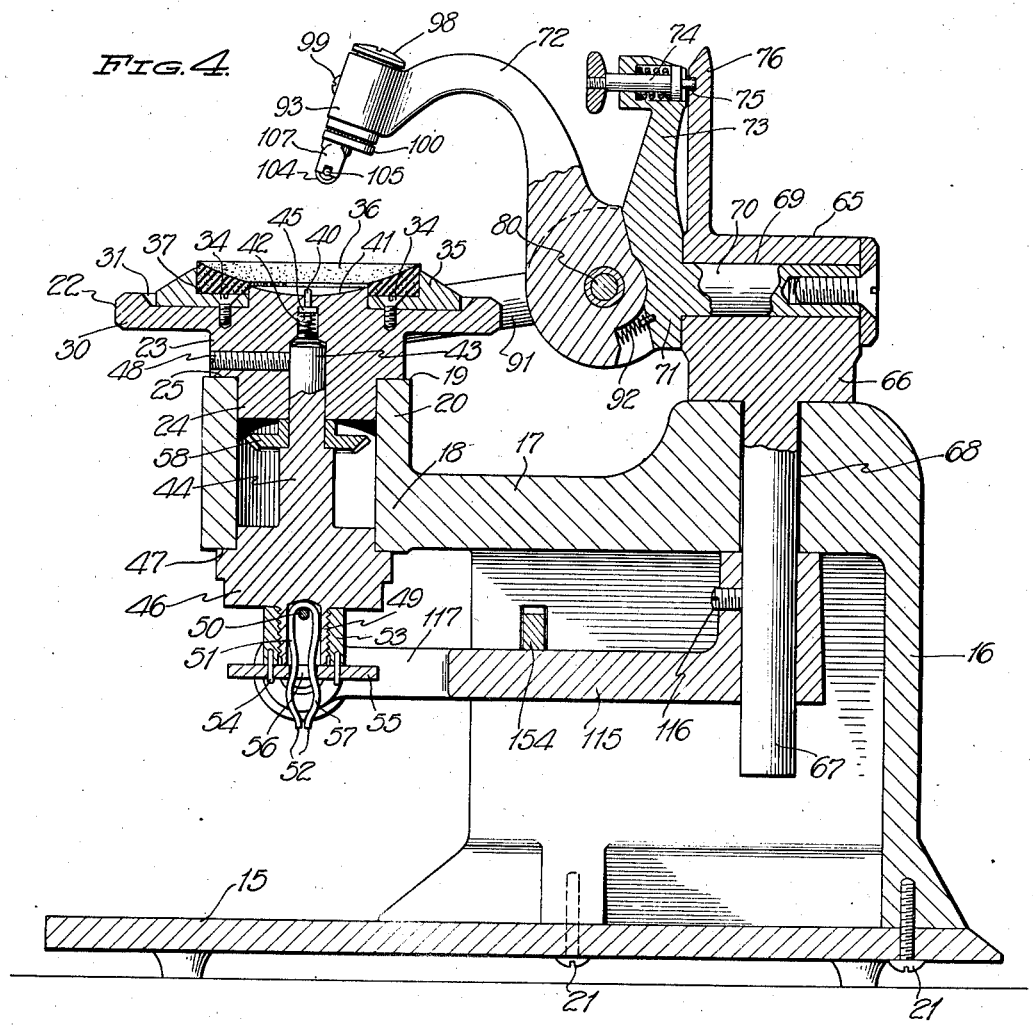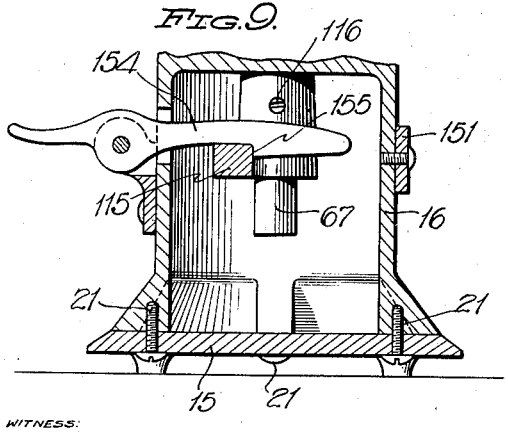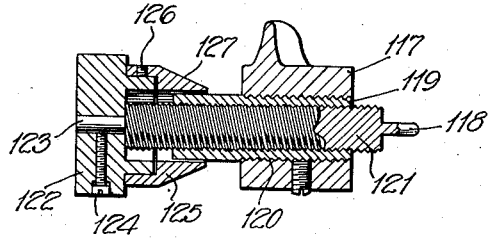

Patented Feb. 20, 1940

2,190,641

UNITED STATES PATENT OFFICE 2,190,641

GLASS CUTTING MACHINE

George W. Burroughs, Ridgewood, N. Y.

Application October 5, 1937, Serial No. 167,343

7 Claims. (Cl. 33—28)

This invention relates to new and useful improvements in glass cutting machines, and more particularly it pertains to a machine for cutting optical lenses.

One object of the present invention is to improve the construction and mode of operation of machines for cutting optical lenses and to provide such machines with mechanism which will effect a better cutting operation than prior machines.

A feature of the invention resides in a novel mechanism for adjusting a cutting element in such a manner that the cutting element engages the work to be operated upon in a position normal to the surface thereof.

A further feature of the invention resides in a novel cutting element adjusting mechanism which will permit of adjustment of the cutting element to a position normal with respect to the surface of the work being operated upon, whether said surface be flat, concaved or convex.

Still a further feature of the invention resides in a novel means for attaching and mounting the cutter element upon the part by which it is carried.

Machines of the afore-mentioned type generally are equipped with a pattern which is engaged by a pattern follower and thereby determines the path of movement of the cutter over the surface being operated upon, and a further feature of this invention resides in a new and novel means for securing or retaining the pattern in operative position.

Still a further feature of the invention resides in a novel construction of pattern follower for determining the path of movement of the cutting element over the surface of the work being operated upon.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

Figure 5:
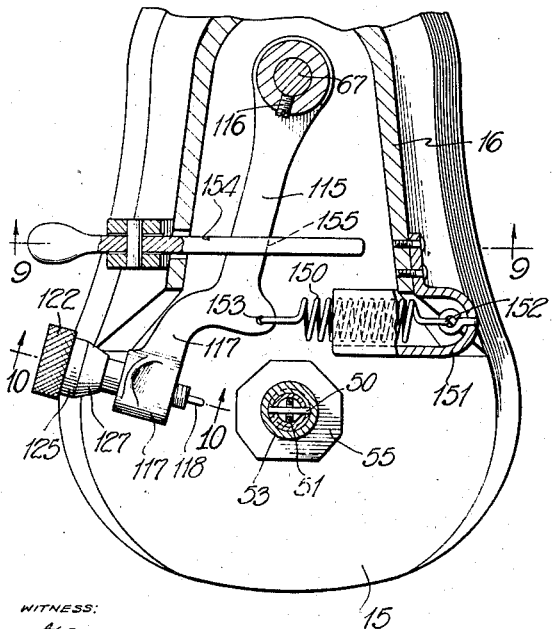
Figure 6:
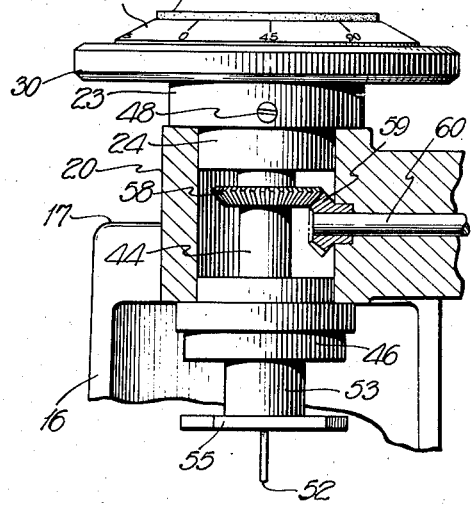

In the drawings:

Figure 1 is a perspective view illustrating a machine constructed in accordance with the present invention, the manner of operation of said machine being illustrated in said figure, Figure 2 is a top plan view of the machine, Figure 3 is a view in front elevation, Figure 4 is a vertical sectional view on an enlarged scale, the view being taken substantially on the line 4—4 of Figure 2, Figure 5 is a horizontal sectional view taken substantially on the line 5—5 of Figure 3, Figure 6 is a detail sectional view illustrating the mounting of the work supporting table, Figure 7 is a detail sectional view taken substantially on the line 7—7 of Figure 2, Figure 8 is a distended perspective view of the mounting mechanism of the cutter element, Figure 9 is a detail sectional view taken substantially on the line 9—9 of Figure 5; and, Figure 10 is a detail sectional view taken substantially on the line 10—10 of Figure 5.

The machine consists of a base 15, and as best illustrated in Figure 4 of the drawings, a hollow standard 16 rises from the base and has its top wall 17 extended forwardly as at 18 and upwardly as at 19 to provide a hollow bearing or journal 20. I prefer to construct the standard 16 of a separate element and secure it to the base by bolts or screws 21, although the invention is not to be limited to the specific construction illustrated.

The reference numeral 22 designates the work supporting platform or table. As best illustrated in Figure 4 of the drawings, the work supporting platform 22 comprises a main body portion 23 from which projects a reduced extension 24 for reception within the upper end of the journal or bearing 20, the reduced portion 24 forming a shoulder 25 which rests upon the upper end of the journal 20.

The work supporting platform has an enlarged portion 30, recessed as at 31 upon its top face and secured within the recess of the work supporting platform or table as by means of screws 34, there is a ring-like member 35 which has an annular seat 37 for the reception of a work supporting element 36. This work supporting element is formed from suitable cushioning material, of which rubber is one very good example, and in order to adapt the machine for operation upon lenses of various cross sectional form, the cushion element is provided with an annular angular face of wall 38.

The reference numeral 40 designates a lens centering pin, and this pin projects slightly above the bottom of the recess 41, disposed centrally of the work supporting platform or table. The pin 40 is maintained in its extended position by means of a coil spring 42, which is compressed between the upper end of the extension 43 of a spindle 44 and a flange 45 formed on said pin. The lower end of the spindle 44 is provided with an enlarged head 46 formed with a shoulder 47 for engaging the lower end of the journal 20. Extending transversely through the body portion 24 of the work supporting platform or table, there is a screw 48, the inner end of which engages the spindle 44 to secure the work supporting platform or table to the spindle and to secure both the work supporting platform or table and the spindle and its enlarged head 46 in operative position in the journal 20. Extending from the lower end of the enlarged head 46 there is a hollow threaded member 49, and extending transversely thereof there is a cross pin 50. Supported by the cross pin 50 there is a resilient member 51 having free ends 52 and threaded upon the member 49 there is a sleeve 53 projecting from the lower end of which there are pins 54. The reference numeral 55 designates a pattern plate, and this pattern plate has openings for the reception of the pins 54, and a central opening 56 for the reception of the looped resilient member 51. In attaching the pattern plate 55 in operative position, as shown in Figure 4, the free ends 52 thereof are inserted in the central opening 56 of the pattern plate, whereupon the plate is elevated, compressing the resilient member which, after its enlarged portions 57 pass through the central opening 56 of the pattern plate 55, expands, and through its resiliency retains the pattern plate 55 in position upon the sleeve 53 and the lower end of the extension 49.

Means is provided to rotate the work supporting platform or table and the pattern plate. This means is preferably manually operated and comprises a beveled gear 58 mounted on the spindle 44. Meshing with the beveled gear 58 there is a beveled gear 59, see Figure 6, carried by a shaft 60 which extends through the journal 20 in a direction at right angles to the extension 17 of the standard 16. The shaft 60 has a crank handle 61 by which it may be rotated, and upon rotation of the shaft, rotary movement will be imparted both to the work supporting platform or table and the pattern plate 55.

The reference numeral 65 designates a cutter head and constitutes the means by which a cutting tool adapted for engagement with a piece of work mounted upon the work supporting platform or table may be moved into engagement with the work and may be adjusted relative thereto in order that the cutting tool or element may assume a position normal to the surface of the work being operated upon. This normal position of the tool relative to the surface operated upon may be identified more clearly by stating that in the cutting of glass a better operation is obtained if the tool engages the work at right angles to the plane of the surface thereof, and inasmuch as the present machine is adapted for operation upon articles in which that surface which the cutting element engages may be either plain, concaved, or convexed, it is important that an adjustment which will permit of the tool assuming a position normal to the surface operated upon be provided.

This cutter head comprises a main body portion 66 from which extends a spindle 67 mounted in a journal or bearing 68 in the hollow standard 16. The main body portion 66 of the cutter head is provided with a journal or bearing 69, and this journal or bearing receives a spindle 70 projecting from a member 71 upon which the cutter arm 72 is pivotally mounted. Extending from the member 71 there is an arm 73 which carries a spring pressed latch 74 adapted to engage in one of a plurality of recesses 75 formed in a segmental member 76 which extends upwardly from the main body portion 66 of the cutter head. By this construction it will be apparent that upon releasing the spring pressed latch 74, the spindle 70 may be rotated in the bearing 69 to adjust the cutter arm to any angle desired after which the spring pressed latch is released to engagement with the ring-like member 35 to retain the cutter arm 72 in its adjusted position. By this arrangement of parts the cutter arm may be so adjusted that when it is moved about its pivotal point to cause engagement of the cutter with the work on the work supporting platform or table, the cutting element will engage said work in a position normal to the surface thereof. The cutter arm is pivotally mounted in the member 71 as at 80 and is provided with a manually operated lever 91 by which it is rocked about its pivotal point to cause the cutter carried thereby to operatively engage a piece of work on the work supporting platform or table. A spring 92 tends normally to move the cutter arm in a direction away from the work when the manually operated lever 91 is released and the spring maintains the cutter arm normally in an elevated position so that the cutting tool will be spaced with respect to the work supporting platform or table, a distance sufficient to permit of free access thereto in the placement and removal of the work to be operated upon.

The cutting arm is provided on its free end with a bearing 93, and as best illustrated in Figures 7 and 8, a sleeve 94 is mounted in said bearing. Mounted within the sleeve 94 there is a spindle 95, which spindle has a flattened portion 96. This spindle has a screw threaded extension 97 which is engaged by a nut 98 which forms the means for holding the sleeve 94 and the spindle 95 in the bearing 93 of the cutter arm. A screw 99 passes through the bearing 93 in a position to engage the flattened portion 96 of the spindle 95 to limit the rotary movement thereof in the sleeve or bushing 94.

The spindle 95 has an enlarged head 100, and extending inwardly of the spindle there is a recess 101 which receives the legs 102 of a looped resilient cutter element carrier 103. The cutter element is in the form of a cutting wheel 104 which is adapted for mounting upon a shaft 105 which is received in the notches 106 of the cutter element carrier 103. Depending from the enlarged head 100 of the spindle 95, there is a forked member 107, and this forked member is adapted to receive the cutter element carrier 103, the resilient legs 102 thereof being inserted between the legs of the forked member 107 and upwardly into the recess 101, as illustrated in Figure 7. The ends of the shaft 105 position themselves in notches 110 in the legs of the forked member when the cutter element and its carrying means are placed in operative position in the enlarged head 100 of the spindle 95. It is to be noted that the forked member 107, in which the cutting element carrier is mounted, is off-set or eccentric with relation to the axis of the spindle 95, and this construction provides for a swiveling action of the cutter with relation to the cutter arm, and performs this function in the positioning of the cutting tool or element normally with respect to the surface being operated upon.

The machine is adapted to cut optical lenses in various shapes in accordance with the shape of the pattern plate employed. To accomplish this result the cutter element must be moved transversely of the work supporting table as the work is being rotated beneath the cutting element. This transverse movement of the cutting element is obtained in the following manner.

The reference numeral 115 designates an arm which is secured to the spindle 67 by means of a set screw or the like 116. The free end of this arm is off-set as at 117 and mounted therein there is a pattern follower 118. The specific construction of this pattern follower is more clearly illustrated in Figure 10 and will, by reference to said figure, be seen to comprise an externally and internally threaded sleeve 119. The external thread of the sleeve 119 is threaded into a recess or threaded passage 120 in the off-set portion 117 of the arm 115. The reference numeral 121 designates a threaded shaft having threaded engagement with the internal thread of the sleeve 119 and the pattern follower 118, heretofore referred to, is in the form of an extension projecting from the free end of the threaded shaft 121. Means is provided to rotate the shaft 121, and this means comprises an operating knob 122 secured to a reduced extension 123 of the shaft 121 by means of a set screw or the like 124. The operating knob carries a conical extension 125 which is secured thereto by a set screw 126 and the angular face 127 of this conical member 125 may be provided with suitable calibrations to determine the adjustment of the pattern follower 118 with respect to the arm 115. By rotation of the knob 122, the shaft 121 is rotated in the threaded sleeve 119 to project or retract the pattern follower 118 with respect to the arm 115, depending upon the direction of rotation of the said shaft 121.

The pattern follower 118 is maintained in engagement with the peripheral edge of the pattern plate 55 by a coil spring 150. One end of this spring is connected to a housing 151 as at 152, the other end being connected to the pivoted arm 115 as at 153. This spring 150 tends to pull the lever 115 in a direction which causes the pattern follower 118 to engage the pattern plate 55. A pivoted latching lever 154 is provided with a hooked portion 155 which engages the lever 115, see Figure 9, to maintain the lever in that position in which it is shown in Figure 5 and in which position the pattern follower 118 is out of engagement with the peripheral edge of the pattern plate 55.

That portion of the pattern follower 118 which engages the peripheral edge of the pattern plate 55 is of a smaller dimension than the width of the edge of the pattern plate. This construction insures the proper engagement of the pattern follower with the pattern plate and prevents undue wear of the peripheral edge of the pattern plate in a defined line and thus obviates inaccuracies as a result of wear of the peripheral edge of the pattern plate.

The reference numeral 160 designates a clamping means for securing the work to be operated upon upon the work supporting platform or table. This clamping member is carried by an arm 161 having an operating nut 162, the arm being mounted upon a shaft 163 which is rotatably mounted in a bearing 164. This clamping element is of more or less conventional form and does not enter into the present invention.

The device operates in the following manner.

A lens to be shaped is placed upon the work supporting platform and secured in engagement therewith by the clamping member 160 in the ordinary manner.

The cutter is next adjusted to engage the work in a position normal to the surface thereof, and this is accomplished by engagement of the spring pressed pin 74 with the proper recess 75, depending upon the type of the surface of the work to be operated upon. After this adjustment has been made, the manually operated lever 91 is depressed, moving the cutter arm 72 about its pivotal point 80 and causing the cutter element to engage the work on the work supporting platform.

With the parts in this position, the crank 61 is rotated, and through the medium of the beveled gears 58 and 59, both the work supporting platform and the pattern plate will be rotated. During rotation of the work supporting platform and the pattern plate, pressure is applied to the manually operated lever 91 to maintain the cutting element 104 in operative engagement with the work being operated upon. It is to be understood that the pivoted latch lever 150 has been released to permit the pattern follower 118 to engage the peripheral edge of the pattern, and as the work supporting table and the pattern are rotated, the cutting element will be moved transversely of the work operated upon to perform the cutting operation in a line corresponding in shape to the contour of the pattern plate 55.

After the cutting operation has been completed the applied pressure to the manually operated lever 91 is released and the spring 92 functions to move the cutter arm 72 to the elevated position in which it is shown in Figure 4. At this time the pivoted arm 115 is moved to a point where the latch lever 154 will engage it and hold it in a position against the tension of the spring 150 in which the pattern follower will be spaced from the pattern plate, as illustrated in Figure 5.

The size of the lens cut is determined by the adjustment of the pattern follower with respect to the pivoted arm 115, and this is accomplished by a turning of the operating knob 122 of the shaft 121. For example, if the operating knob 122 is rotated to advance the shaft 121 in Figure 10, then the lens will be of a larger size than would be the case if the shaft 121 were retracted and by reason of the calibrations and the micrometer adjustment of the shaft 121, a highly accurate adjustment of the pattern follower may be obtained.

From the foregoing it will be apparent that the present invention provides a new and novel machine for cutting glass and particularly for shaping optical lenses which is simple in construction and highly efficient in operation. Furthermore, the present machine provides for accurate positioning of the cutting tool in a position normal to the surface of the work being operated upon, and furthermore, such adjustment may be positively made before the cutting operation is started.

In the present application, the machine is embodied in its preferred form but it is to be understood that the invention is not to be limited to the specific constructions herein illustrated and that it may be carried out in other forms which rightfully fall within the scope of the appended claims.

Having thus described the invention, what is claimed as new, is:

1. In a machine of the class described, in combination, a rotating pattern, a pivoted arm, and a pattern follower carried by said pivoted arm, said pattern follower comprising a threaded shaft, an internally and externally threaded sleeve threaded on said threaded shaft and an operating member carried by the threaded shaft for rotating it within the threaded sleeve.

2. In a machine of the class described, in combination, a rotating pattern, a pivoted arm, and a pattern follower carried by said pivoted arm, said pattern follower comprising an externally and internally threaded sleeve having threaded engagement with said pivoted arm, a threaded shaft having threaded engagement with said sleeve and movable therethrough upon rotation of the threaded shaft, means for rotating said threaded shaft, and a pattern engaging projection extending from the free end of said threaded shaft.

3. In a machine of the class described, in combination, a rotating pattern, a pivoted arm, and a pattern follower carried by said pivoted arm, said pattern follower comprising an externally and internally threaded sleeve having threaded engagement with said pivoted arm, a threaded shaft having threaded engagement with said sleeve and movable therethrough upon rotation of the threaded shaft, means for rotating said threaded shaft, and a pattern engaging projection extending from the free end of said threaded shaft, said pattern engaging projection being smaller than the width of the peripheral edge of the pattern.

4. In a glass cutting machine of the class described, a base, a work supporting table carried by the base, a cutter head pivotally mounted on the base, a segment extending vertically from the cutter head, an adjustable cutter arm supporting member pivotally mounted in the cutter head, a cutter arm pivotally mounted in the cutter arm supporting member, a rigid arm extending upwardly from said cutter arm supporting member in parallelism to the face of said segment and means carried by said rigid arm for engagement with said segment for securing the cutter arm supporting member in an adjusted position relative to the cutter head about its pivotal mounting thereon and relative to the work supporting table.

5. In a glass cutting machine of the class described, a base, a work supporting table carried by the base, a cutter head pivotally mounted on the base, a segment extending vertically from the cutter head, an adjustable cutter arm supporting member pivotally mounted in the cutter head and movable about a horizontal axis therein, a cutter arm pivotally mounted in the cutter arm support and movable about a horizontal axis disposed at right angles to the axis of the cutter arm supporting member, and means carried by the cutter arm supporting member for engagement with the segment to hold the cutter arm supporting member in its adjusted position relative to the cutter head about its pivotal mounting thereon and relative to the work supporting table.

6. In a glass cutting machine of the class described, a base, a hollow standard extending vertically from the base, a cutter head, a spindle extending from the cutter head and into the hollow standard and providing a vertical pivot for the cutter head, a horizontally extending bearing in the cutter head, an adjustable cutter arm supporting member pivotally mounted in said horizontally extending bearing, means for securing said cutter arm supporting member in its adjusted positions relative to the cutter head about its pivotal mounting thereon and relative to the work supporting table, and a cutter arm carried by the cutter arm supporting member and pivotally mounted about a horizontal axis extending at right angles to the axis of the pivotal mounting of the cutter arm supporting member.

7. In a glass cutting machine of the character described in combination, a base, a hollow standard extending vertically from said base, an extension projecting from the vertical standard, a work supporting table rotatably mounted in the free end of said extension, a cutter head pivotally mounted in said standard, an adjustable cutter arm supporting member pivotally and adjustably mounted in the cutter head, for adjusting a cutter arm carried thereby relatively to the supporting surface of the work supporting table, means for securing the cutter arm supporting member in its adjusted positions relative to the cutter head about its pivotal mounting thereon and relative to the work supporting table, and a cutter arm freely pivoted in the cutter arm supporting member for movement into and out of operative relation with respect to the work supporting table.

GEORGE W. BURROUGHS.